(12) United States Patent
Bernard et al.

(10) Patent No.: US 11,894,761 B2
(45) Date of Patent: Feb. 6, 2024

(54) POWER SUPPLY FOR USE WITH ELECTRODYNAMIC SCREEN

(71) Applicant: Sol Clarity, Inc., Somerville, MA (US)

(72) Inventors: Annie Bernard, Boston, MA (US); Ryan Eriksen, Maynard, MA (US); Benjamin Livney, W Melbourne, FL (US); Mark Horenstein, West Roxbury, MA (US)

(73) Assignee: Sol Clarity, Inc., Somerville, MA (US)

( * ) Notice: Subject to any disclaimer, the term of this patent is extended or adjusted under 35 U.S.C. 154(b) by 0 days.

(21) Appl. No.: 17/840,016

(22) Filed: Jun. 14, 2022

(65) Prior Publication Data
US 2022/0399833 A1 Dec. 15, 2022

Related U.S. Application Data

(60) Provisional application No. 63/210,336, filed on Jun. 14, 2021.

(51) Int. Cl.
*H02M 1/00* (2006.01)
*H02M 3/155* (2006.01)
*H02M 7/539* (2006.01)

(52) U.S. Cl.
CPC ......... *H02M 1/007* (2021.05); *H02M 1/0095* (2021.05); *H02M 3/155* (2013.01); *H02M 7/539* (2013.01)

(58) Field of Classification Search
CPC .... H02M 1/007; H02M 1/0095; H02M 3/155; H02M 7/539
See application file for complete search history.

(56) References Cited

U.S. PATENT DOCUMENTS

| | | | |
|---|---|---|---|
| 6,608,452 B1 * | 8/2003 | Holmes | H05B 41/28 315/225 |
| 6,911,593 B2 | 6/2005 | Mazumder et al. | |

(Continued)

FOREIGN PATENT DOCUMENTS

WO    WO-2022/266093 A1    12/2022

OTHER PUBLICATIONS

Eriksen et al., "Water and Cost Reduction from the Application of EDS to Facilitate Water Free Cleaning in Concentrated Solar Power," MRS Advances , 3(25) (Energy and Sustainability), 1405-1410 (2018).

(Continued)

*Primary Examiner* — Jue Zhang
(74) *Attorney, Agent, or Firm* — Stephen J. Kenny; Vincenzo DiMonaco; Foley Hoag LLP

(57) ABSTRACT

An AC power supply for connection to at least one electrode of an electrodynamic screen includes a DC-to-DC converter electrically coupled to a source of DC voltage including an output. The system includes a DC-to-AC converter electrically coupled to the output of the DC-to-DC converter, including a two-terminal passive element electrically coupled in series with a first transistor including a control terminal electrically coupled to a periodic voltage signal configured to switch the first transistor between an on/off state. The system includes an AC output including an AC voltage configured to change periodically. The system includes a regulator circuit configured to sample the AC output voltage and detect when the AC output voltage reaches a predetermined voltage. The regulator circuit is configured to electrically couple the power supply to the source of DC voltage when the output voltage is less than the predetermined voltage.

16 Claims, 10 Drawing Sheets

(56) References Cited

U.S. PATENT DOCUMENTS

| | | | |
|---|---|---|---|
| 8,513,531 | B2 | 8/2013 | Trigwell et al. |
| 9,123,845 | B2 | 9/2015 | Ashpis |
| 9,433,336 | B2 | 9/2016 | Mazumder |
| 2012/0313443 | A1 | 12/2012 | Cheng et al. |
| 2013/0263393 | A1* | 10/2013 | Mazumder .......... H01L 31/0543 |
| | | | 427/535 |
| 2014/0261536 | A1 | 9/2014 | Buhler et al. |
| 2016/0380631 | A1 | 12/2016 | Tamura |
| 2018/0337586 | A1* | 11/2018 | Choi .................... H02M 3/155 |
| 2020/0061678 | A1 | 2/2020 | Tombs et al. |
| 2020/0412164 | A1 | 12/2020 | Miller |
| 2022/0399833 | A1 | 12/2022 | Bernard et al. |

OTHER PUBLICATIONS

Horenstein et al., "Modeling of trajectories in an electrodynamic screen for obtaining maximum particle removal efficiency," IEEE Transactions on Industry Applications, 49(2): 707-713 (2013).

International Search Report and Written Opinion for International Application No. PCT/US2022/33426, dated Nov. 15, 2022.

Mazumder et al., "Development of Transparent Electrodynamic Screens on Ultrathin Flexible Glass Film Substrates for Retrofitting Solar Panels and Mirrors for Self-Cleaning Function," MRS Advances, 1(15): 1003-1012 (2016).

Mazumder et al., "Mitigation of Dust Impact on Solar Collectors by Water-Free Cleaning With Transparent Electrodynamic Films: Progress and Challenges," IEEE Journal of Photovoltaics, 7(5): 1342-1353 (2017).

Nabulsi et al., "A 300 Watt Cascaded Boost Converter Design for Solar Energy Systems," (IEEE International Conference on Electric Power and Energy Conversion Systems, 2009; Fundamentals of Power Electronics by Robert Erickson and Dragan Maksimovic (Springer 2020).

Sayyah et al., "A Comprehensive Analysis of the Electric Field Distribution in an Electrodynamic Screen," Journal of Electrostatics, 76: 115-126 (2015).

Sayyah et al., "An experimental study on the characterization of electric charge in electrostatic dust removal," Journal of Electrostatics , 87: 173-179 (2017).

Sayyah et al., "Electrostatic Force Distribution on an Electrodynamic Screen," Journal of Electrostatics, 81: 24-36 (2016).

* cited by examiner

POWER SUPPLY FOR USE WITH ELECTRODYNAMIC SCREEN

CROSS REFERENCE TO RELATED APPLICATIONS

This application claims the benefit of priority to U.S. Provisional Application Ser. No. 63/210,336 filed on Jun. 14, 2021, the entirety of which is incorporated by reference herein.

BACKGROUND OF THE DISCLOSED SUBJECT MATTER

Field of the Disclosed Subject Matter

The disclosed subject matter relates to a system for removing particles from transparent surfaces. In particular, the present disclosed subject matter is directed toward a power supply to be used with an electrodynamic screen (EDS) for the purpose of removing dust and other small particles from surfaces upon which such particles have accumulated. Examples include the use of EDS technology to clean photovoltaic (PV) panels, solar-water heaters, and concentrating reflectors used in solar power systems and heating applications, also known as concentrated solar power (CSP) reflectors. Other uses of the EDS may include the cleaning of mirrors, lenses, telescope apertures, and other optical systems, displays, electronic screens, portals, windows, and floors, as well as applications requiring the transport of particles. Basically, EDS technology can be used to clean particles of dust or other contaminants from most non-conducting surfaces.

In the area of solar power, photovoltaic and concentrated solar power have the potential to contribute substantially to worldwide energy needs as a means for reducing the burning of fossil fuels for energy. Large installations of PV or CSP at the megawatt (MW) or higher-level capacity are often located in arid desert regions of the globe where sunlight is plentiful, land is cheap, solar flux is high, and clouds and rain are scarce. While such desert regions are the sunniest on Earth, they are also among the dustiest locations in the world. Dust particles, generally in the form of fine sand, often deposit on such solar collectors, thereby obscuring sunlight and reducing total power output of the solar plant. This phenomenon is also called "soiling" in the field of solar power. As an example of the problem, a deposit of just 4 grams-per-square meter of dust particles in the size range 0.5 to 10 microns can reduce the power output of a solar plant by as much as 40% of that obtainable with dust-free collectors.

In another example, and in no way limiting the application thereof, optical systems such as lenses, typically, but not limited to those used in outdoor environments, may also suffer from the accumulation of dust and other particles. Keeping such systems in optimal working order requires that critical lens surfaces be kept dust free. Similarly, the surfaces of building windows may suffer from particle accumulation, particularly in desert environments.

DESCRIPTION OF RELATED ART

A variety of methods and systems are known for removing dust from surfaces. Systems for maintaining clean solar panels and solar concentrators have been developed in the past. Some have involved manual cleaning using soft brushes with water and detergents. Such manual methods of cleaning are generally labor intensive, adding significantly to the cost of cleaning. Some technologies developed for cleaning PV panels have relied on robotic devices that travel on rails or slides to remove dust via rotating brushes. Other cleaning techniques have used wipers or vibrators as a way to remove accumulated dust. Yet other automated systems apply flowing water or spray directly onto solar collectors. Each of these methods suffers from drawbacks known in the art, including vulnerable moving parts and adverse water consumption. These contact cleaning methods also abrade the surface, which in the case of solar panels for example, can wear away anti-reflective coatings, resulting in a permanent 2-3% loss of power output.

Another technique for removing dust relies on electrostatic forces to move the particles. In such systems, an electrodynamic screen (EDS) is formed by depositing a set of two or more interdigitated, conductive electrodes on a glass, polymer, or other insulating substrate. These electrodes are energized by poly-phased voltages, with the system typically comprising, but not limited to, three electrode sets and three voltage phases. Electrode voltages, which can be applied at any suitable amplitude, typically have magnitudes between 500 V and 3,000 V at frequencies over the range 1 to 100 Hz. Other voltages and frequencies are also possible. The interdigitated electrodes produce a laterally moving, traveling wave of electrostatic field. This field exerts coulomb and other forces on deposited particles, thereby lifting them off the surface and transporting them to an outer edge of the screen. In solar applications, this clearing of particles substantially restores the power output of the collector.

One critical component of an EDS system is the power supply that energizes the electrodes. The EDS power supply must provide a periodic, alternating voltage to each electrode, in the proper phase, so as to produce a moving wave of electrostatic field at the EDS surface. The latter is necessary to move dust particles off the surface of the EDS screen. Many developers of EDS devices have relied on expensive laboratory-grade or "benchtop" power supplies to produce the needed voltages. Others have developed custom-designed power supplies that are made at considerable cost due to the use of many expensive or specialty parts. It is generally accepted, however, that the expected widespread growth of solar power will require plants to produce power at as low a cost as possible, thereby requiring inexpensive power supplies. For the purposes of this disclosure, "periodic" is characteristic of an entity, such as a signal, to repeat one or more values, sequences or steps at regular intervals or periods.

Previous power supplies used for EDS systems in the laboratory consume many watts of power and have large physical form factors. This drawback is particularly true for DC power supplies in the kilovolt range. Commercial kilovolt-level DC-to-DC converters exist, and some of these power supplies are compact and consume little power, but their prices discourage their use in large-scale solar power installations where low cost is a significant factor. What is needed is an inexpensive power supply that can reliably perform under myriad of conditions. Such a power supply must be capable of producing poly-phase voltages, preferably in the kilovolt range, at frequencies in the typical range of about 1 Hz to 100 Hz.

One embodiment of the power supply disclosed herein makes use of the cascaded-boost converter (CBC) configuration of switching power supply. This type of DC-to-DC (DC/DC) converter, shown in its basic form in prior-art FIG. 3, is described in both the technical literature and in several prior-art patents. For example, the cascaded-boost converter is explained in depth in "A 300-Watt Cascaded Boost Converter Design for Solar Energy Systems" by A. Al Nabulsi et all (IEEE International Conference on Electric Power and Energy Conversion Systems, 2009), and in *Fundamentals of Power Electronics* by Robert Erickson and Dragan Maksimovic (Springer 2020). Embodiments of the disclosed invention may be based on other types of switching power supplies, including classic boost converters, buck/boost converters, and linear power supplies that are not of the switching type.

The disclosed power-supply modifications, specifically designed for use with an electrodynamic screen, add additional features to such classic configurations, such as the cascaded-boost embodiment, to produce a low-cost power supply suitable for use with EDS technology.

SUMMARY OF THE DISCLOSED SUBJECT MATTER

The purpose and advantages of the disclosed subject matter will be set forth in and will be apparent from the description that follows and will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described herein, the disclosed subject matter includes a method of high voltage generation by using a switching power supply, wherein the converter operates with a minimally power-consuming, load. Such a scenario may arise when the converter drives a capacitive load, such as the electrodes of an EDS device. Some existing high-voltage power supplies that are suitable for driving capacitive loads convert a low-voltage, "direct-current" (DC) input to a low-voltage "alternating current" (AC) output. The latter (AC current) is then fed to a transformer which steps up the voltage. The transformer output may then be rectified, if needed, to produce high-voltage DC. The disclosed power-supply configuration produces high-voltage DC without using a transformer and without intermediate DC-to-AC conversion. It also allows for the conversion of high-voltage DC into a high-voltage AC output.

The disclosed subject matter includes a system for producing both single-phase and poly-phase high-voltage AC. It also includes a method for regulating the peaks of the single or poly-phase voltage output(s) using an analog, hysteretic, two-position controller. The disclosed controller can modulate the frequency of the AC output while also regulating its peak voltage. Inasmuch as some EDS devices are prone to electrical breakdown between electrodes if the applied voltage is too high, such regulation has the advantage that it protects its EDS load from breakdown while also protecting power-supply components from undue stress due to overvoltage. The controller is designed so that it can be implemented using low-cost, commercial, "off the shelf" components generally available from commercial parts vendors.

To achieve these and other advantages and in accordance with the purpose of the disclosed subject matter, as embodied and broadly described herein, the disclosed subject matter includes a system for an AC power supply for connection to at least one electrode of an electrodynamic screen, the power supply including a DC-to-DC converter electrically coupled to a source of DC voltage, the DC-to-DC converter further including an output of the DC-to-DC converter. The system includes a DC-to-AC converter electrically coupled to the output of the DC-to-DC converter, the DC-to-AC converter further including a two-terminal passive element electrically coupled in series with a first transistor, the first transistor including a control terminal, wherein the control terminal of the first transistor is electrically coupled to a periodic voltage signal configured to switch the first transistor into an on state and an off state. The system includes an AC output, the AC output including an AC voltage configured to change periodically. The system includes a regulator circuit configured to sample the AC output voltage of the power supply, the regulator circuit further configured to detect when the AC output voltage reaches a predetermined voltage, and wherein the regulator circuit is configured to electrically couple the power supply to the source of DC voltage when the output voltage is less than the predetermined voltage.

In embodiments of the present subject matter, the periodic voltage signal is configured to control the on/off state of the at least a transistor causes the AC output to transition periodically, at a predetermined frequency, between zero and a positive or negative voltage of a magnitude larger than zero.

In embodiments of the present subject matter, the periodic voltage signal comprises a frequency, the frequency configured to vary.

In embodiments of the present subject matter, the regulator circuit includes a second transistor configured to connect and disconnect the power supply to the source of DC voltage.

In embodiments of the present subject matter, the DC-to-DC converter is a cascaded-boost converter.

In embodiments of the present subject matter, the second transistor is a p-channel MOSFET.

In embodiments of the present subject matter, the cascaded-boost converter operates in a discontinuous mode.

In embodiments of the present subject matter, the output voltage is applied to at least one electrode of an electrodynamic screen, the electrode including a capacitance electrically coupled in parallel with the AC output of the power supply.

In embodiments of the present subject matter, the periodic voltage signal configured to control the on/off state of the first transistor causes the AC output of the power supply to transition periodically between a positive voltage and a negative voltage.

In embodiments of the present subject matter, the periodic voltage signal includes a frequency, the frequency configured to change over time.

In embodiments of the present subject matter, the periodic voltage is produced by an astable multivibrator.

In embodiments of the present subject matter, the AC output includes a plurality of distinct AC outputs.

In embodiments of the present subject matter, the plurality of distinct AC outputs apply poly-phased voltages to a plurality of electrodes of an electrodynamic screen.

In embodiments of the present subject matter, the number of poly-phased voltages is between two and five.

In embodiments of the present subject matter, the AC output voltage of the power supply is configured to transition periodically between a voltage near zero and a voltage, wherein the voltage comprises a magnitude no larger than one kilovolt.

In embodiments of the present subject matter, the magnitude of the AC output voltage of the power supply is configured to increase in magnitude to a predetermined value that is larger than one kilovolt.

To achieve these and other advantages and in accordance with the purpose of the disclosed subject matter, as embodied and broadly described herein, the disclosed subject matter includes a system for an analog hysteretic two-position regulator circuit for use with a power supply, the regulator circuit including a Schmitt trigger, the Schmitt trigger further including an input to the Schmitt trigger, the input being derived from an output of a voltage sampling circuit electrically coupled to a power supply output. The system includes an output from the Schmitt trigger. The system includes a first comparator comprising an input to the first comparator, the input to the first comparator electrically coupled to the output from the Schmitt trigger via a first resistor and a second comparator comprising an output from the second comparator, the output from the second comparator electrically coupled to the input to the Schmitt trigger via a second resistor. The second comparator further includes an input to the second comparator, the input to the second comparator electrically coupled to a periodic voltage signal. The system includes a resistor network electrically coupled to a power supply input voltage and a reference ground, the resistor network configured to provide a reference voltage. The system includes the reference voltage electrically coupled to a second input of the first comparator and a second input of the second comparator. The system includes a cascaded boost converter, the cascaded boost converter comprising an input voltage terminal. The system includes a transistor configured to switch between an on state and an off state, the transistor electrically coupled between the power supply input voltage and the input voltage terminal of the cascaded boost converter, the transistor comprising a control terminal, the control terminal electrically coupled to the output of the first comparator. The transistor configured to switch to the on state in response to an output voltage of the cascaded boost convert, wherein the output voltage of the cascaded boost converter is below a predetermined threshold. The transistor further configured to switch to the off state in response to an output voltage of the cascaded boost converter wherein the output voltage of the cascaded boost converter is above the predetermined threshold.

In embodiments of the present subject matter, the regulator circuit further includes a tunable, pulsed-output voltage regulation and timing system, the tunable, pulsed-output voltage regulation and timing system further including a cascaded-boost converter.

In embodiments of the present subject matter, the regulator circuit includes a plurality of distinct regulator circuits configured to be electrically coupled.

In embodiments of the present subject matter, the regulator circuit includes between two and five distinct regulator circuits.

It is to be understood that both the foregoing general description and the following detailed description are exemplary and are intended to provide further explanation of the disclosed subject matter claimed.

The accompanying drawings, which are incorporated herein and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and do not reflect the physical size of the disclosed circuitry. The drawings in schematic form illustrate various aspects and features of the present subject matter and may illustrate one or more embodiment(s) or example(s) of the present subject matter in whole or in part.

DETAILED DESCRIPTION OF AN EXEMPLARY EMBODIMENT

Reference will now be made in detail to exemplary embodiments of the disclosed subject matter, examples of which are illustrated in the accompanying drawings. The method and corresponding steps of the disclosed subject matter will be described in conjunction with the detailed description of the system.

The methods and systems presented herein may be used for producing poly-phase voltages at the kilovolt level over an approximate frequency range of 1 to 100 Hz. It is understood that voltages more than, or less than, one kilovolt are to be included within the scope of the invention. Likewise, AC voltage output frequencies within this general range, but higher or lower in frequency, are to be included within the scope of the invention. The disclosed power supply configuration is particularly suited for use in driving an electrodynamic screen for the purpose of removing dust particles from the surfaces of solar collectors. The deposition of such particles in a solar power plant can significantly reduce power output capability. For the purposes of this disclosure, a "power supply" is a device configured to supply electric power to an electrical load. Additionally or alternatively, a power supply may be configured to convert electric current from a source to the correct voltage, current and frequency to the electrical load. For example and without limitation, the power supply may be a standalone component or built into a larger system or plurality of connected components.

Figure 1:
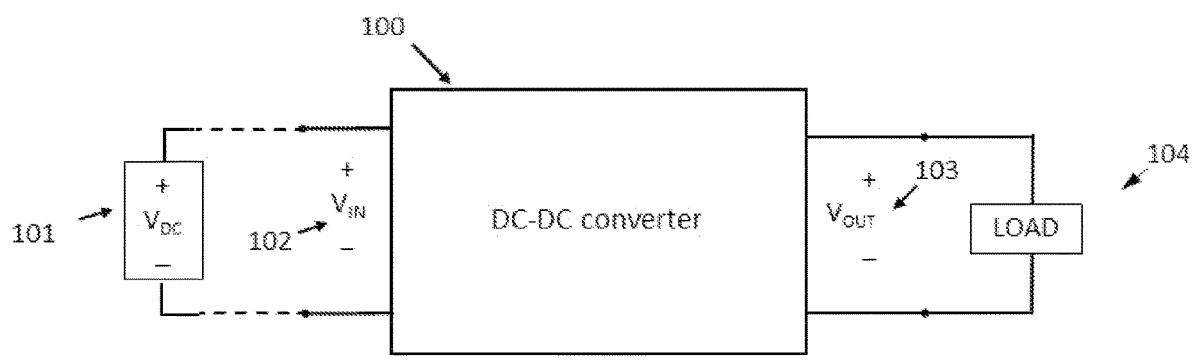
FIG. 1 is a diagram of a prior-art power supply.

In FIG. 1, a prior-art power-supply module 100 is adapted to be connected to a source 101 of DC power that applies $V_{DC}$ to the $V_{IN}$ input 102 of the power-supply module. Power-supply module 100 produces an output voltage 103 ($V_{OUT}$) that is applied across the terminals of load 104. Load 104 can be a resistor, capacitor, other circuit element, or any other circuit or electrical system requiring voltage. For the purposes of this disclosure, "electrically coupled" is the configuration referring to one or more components being connected by at least a conductor or means for transferring electrical energy.

Figure 2:
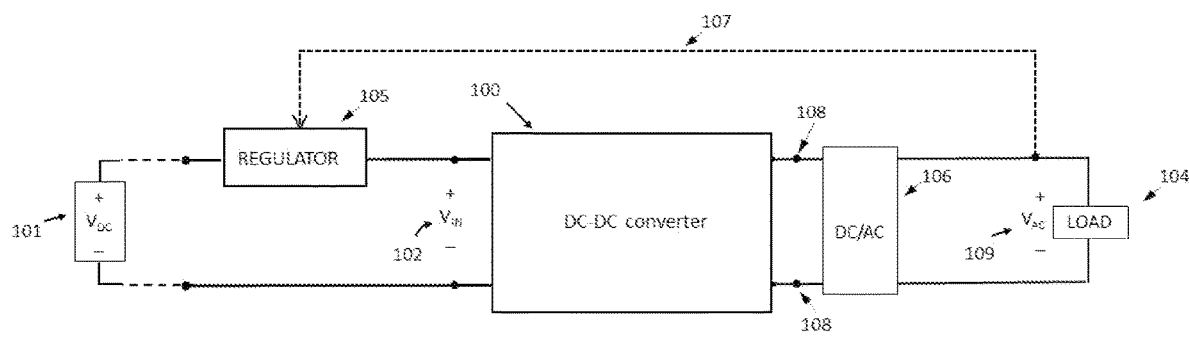
FIG. 2 is a diagram of the overall configuration of the power supply incorporating aspects of the disclosed invention.

For the purpose of explanation and illustration, and not limitation, an exemplary embodiment of the system in accordance with the disclosed subject matter is shown in FIG. 2. FIG. 2 shows additional elements added to power-supply module 100. These additional elements comprise portions of the disclosed invention. Regulator 105 is a circuit connected in series between one terminal of the input voltage source 101 and a corresponding terminal of the $V_{IN}$ input 102. Regulator 105 receives a voltage representative of $V_{OUT}$ 103 via feedback path 107 to communicate to regulator 105 the instantaneous value of output 103 for the purpose of regulating $V_{OUT}$. A DC-to-AC converter circuit 106, connected at output terminals 108 of the DC-to-DC converter 100, acts to convert the voltage output of converter 100 into $V_{AC}$, which constitutes an AC output 109 suitable for driving load 104. For the purposes of this disclosure, "terminal" is the point at which a conductor from a component, device or network comes to an end. Terminal may also refer to an electrical connector at this endpoint, acting as the reusable interface to a conductor and creating a point where external circuits can be connected. A terminal may simply be the end of a wire or it may be fitted with a connector or fastener.

Figure 3:
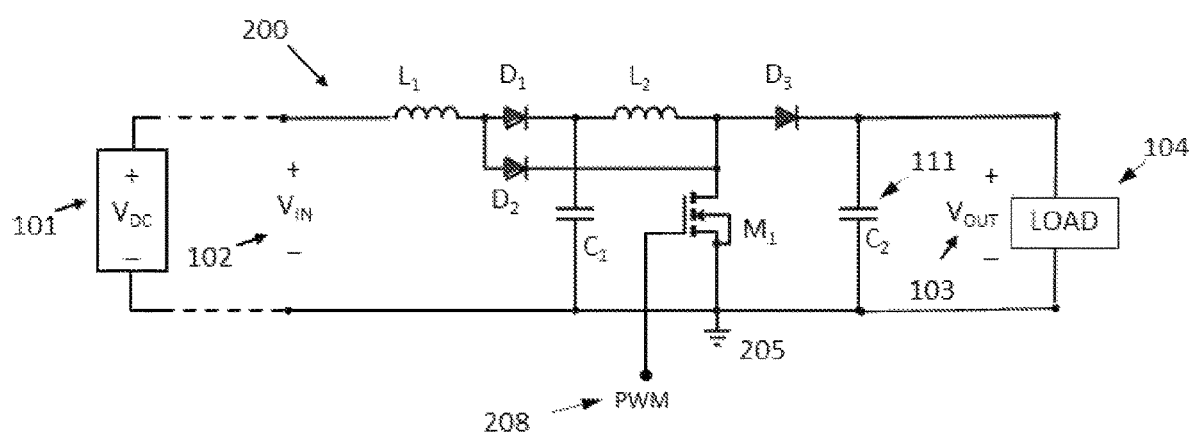
FIG. 3 is a schematic representation of a prior-art cascaded-boost converter driving a load.

FIG. 3 shows prior-art circuit 200 based on the topology of the cascaded-boost converter (CBC) known in the art. Circuit 200 comprises one prior-art embodiment of the DC-to-DC converter circuit 100 shown in FIG. 1. In FIG. 3, a first terminal of inductor $L_1$ is connected to the anodes of diodes $D_1$ and $D_2$. A second terminal of $L_1$ is adapted to be connected to one terminal of DC source. The cathode of $D_1$ is connected to a first terminal of inductor $L_2$, and the cathode of diode $D_2$ is connected to a second terminal of inductor $L_2$. Capacitor $C_1$ is connected between the cathode of diode $D_1$ and reference ground 205. Transistor $M_1$, in this embodiment an n-channel, metal-oxide-semiconductor field-effect transistor (MOSFET), is connected between the cathode of diode $D_2$ and reference ground 205. Transistor $M_1$ operates as a switch.

For the purposes of this disclosure, a "transistor" is a semiconductor device configured to switch and/or amplify electrical signals and power. When configured as a switch, a transistor may include an "off" and "on" states or phases. Important parameters for this application include the current switched, the voltage handled, and the switching speed, characterized by the rise and fall times. Parameters are chosen such that the "off" output is limited to leakage currents may be too small to affect connected circuitry, the resistance of the transistor in the "on" state may be too small to affect circuitry, and the transition between the two states may be fast enough not to have a detrimental effect.

According to embodiments of the disclosed subject matter, transistors such as bipolar transistors may be used in switching applications, and requires biasing the transistor so that it operates between its cut-off region in the off-state and the saturation region (on). This requires sufficient base drive current. As the transistor provides current gain, it facilitates the switching of a relatively large current in the collector by a much smaller current into the base terminal. The ratio of these currents varies depending on the type of transistor, and even for a particular type, varies depending on the collector current.

For the purposes of this disclosure, a "switch" is an electrical component configured to disconnect or connect the conducting path in an electrical circuit, interrupting the electric current or diverting it from one conductor to another. According to embodiments of the present disclosure, a switch may include one or more switches or types of switches. For example and without limitation, a switch may include sets of contacts controlled by the same knob or actuator, and the contacts may operate simultaneously, sequentially, or alternately. A switch may be operated manually, for example, a light switch or a keyboard button, or may function as a sensing element. Many specialized forms exist, such as the push-button switch, reversing switch, relay, and circuit breaker. According to embodiments of the present subject matter, one or switches configured for use in high-powered circuits may have special construction to prevent destructive arcing when they are opened.

The anode of diode $D_3$ is connected to the cathode of diode $D_2$ and the second terminal of inductor $L_2$. The cathode of diode $D_3$ is connected to the positive (+) terminal of output voltage $V_{OUT}$ which is applied to load 104. Storage capacitor $C_2$ is connected between the (+) side of TOUT and reference ground 205.

The control terminal of transistor $M_1$, generally the gate terminal of a MOSFET, is driven by pulse-width-modulated (PWM) control signal 208. The PWM signal may be derived from one of any astable multi-vibrator circuits known in the art, for example from a 555-timer integrated circuit or microcontroller. For the purposes of this disclosure, the "pulse-width-modulated (PWM) control signal is a modulation technique that generates variable-width pulses to represent the amplitude of an input signal. For the purposes of this disclosure, an "astable multivibrator" includes two amplifying stages connected in a positive feedback loop by two capacitive-resistive coupling networks in which the circuit is not stable in either state, it continually switches from one state to the other. The circuit has two astable (unstable) states that change alternatively with maximum transition rate because of the "accelerating" positive feedback. It is implemented by the coupling capacitors that instantly transfer voltage changes because the voltage across a capacitor cannot suddenly change. In each state, one transistor is switched on and the other is switched off. Accordingly, one fully charged capacitor discharges (reverse charges) slowly thus converting the time into an exponentially changing voltage. At the same time, the other empty capacitor quickly charges thus restoring its charge (the first capacitor acts as a time-setting capacitor and the second prepares to play this role in the next state). The circuit operation is based on the fact that the forward-biased base-emitter junction of the switched-on bipolar transistor can provide a path for the capacitor restoration.

The load 104 is connected between the (+) and (−) terminals of the output $V_{OUT}$. This load could be, among other things, a resistor, capacitor, inductor, any combination of these three elements, or an electronic circuit that requires power from power-supply module 200.

The operation of the cascaded-boost converter of FIG. 3 is known in the art. The circuit is generally analyzed as follows: For the time $t_{on}$ that switching transistor $M_1$ is on, the change in current through inductors $L_1$ and $L_2$ can be expressed by:

$$\Delta I_{L1} = \frac{V_{IN}}{L_1}DT, \Delta I_{L2} = \frac{v_{C1}}{L_2}DT, \quad (1)$$

where T is the period of the PWM signal and D=$t_{on}$/T is the duty cycle, i.e., the percentage of time of the cycle that $M_1$ is "on". Similarly, for the time $t_{off}$ that transistor $M_1$ is off, the change in current through inductors $L_1$ and $L_2$ can be expressed by:

$$\Delta I_{L1} = \frac{V_{IN} - v_{C1}}{L_1}(1-D)T, \Delta I_{L2} = \frac{v_{C1} - V_{OUT}}{L_2}(1-D)T \quad (2)$$

These equations assume that the forward voltage drops across $D_1$ and $D_2$ are small relative to $V_{IN}$ and can be neglected in the calculations. Applying the principle of current balance to inductors $L_1$ and $L_2$ reveals that:

$$V_{OUT} = \frac{V_{IN}}{(1-D)^2}$$

which is the expected transfer function for two boost converters cascaded with each other. Of note is the fact that $V_{OUT}$ is larger in magnitude than $V_{IN}$, because D<1. The preceding analysis is valid only when the CBC delivers sufficient current to the load. If the load 104 is represented, for the sake of analysis, as a resistor $R_{LOAD}$, then current $V_{OUT}/R_{LOAD}$ will flow into the load 104. The current flowing into $R_{LOAD}$ represents the current drawn by a power-consuming load connected across the $V_{OUT}$ terminals. If sufficient load current is not drawn by the load, then CBC 200 will perform essentially as a current source that continually increases the charge stored in output capacitor $C_2$, thereby continually increasing output voltage 103.

It is known in the art that an EDS electrode can be modeled as a capacitive load. If CBC 200 drives an EDS, then output capacitor 111 ($C_2$) will be connected in parallel with such a capacitive load. As noted above, the parallel combination of these capacitors will be continually charged, because the circuitry inside CBC 200 will act essentially as a current source charging the capacitances. If neither capacitor $C_2$ nor the EDS-electrode capacitive load succumbs to breakdown due to overvoltage, output voltage 103 of the converter of FIG. 3 will be limited only by the reverse breakdown voltage of diode $D_3$. Power losses in the circuit may also limit the charging of capacitor $C_2$ and the EDS capacitance. For example and without limitation, the EDS may include a window, a solar/photovoltaic panel, a mirror, an electronic screen, lenses, telescopes, optical systems, portals, windows, electronic displays, and floors, or any application requiring the transport of particles.

According to Equations (1) and (2), when the load is capacitive, the load cannot draw sufficient current to maintain continuous-mode operation of the DC/AC converter 106. Thus the converter will operate in the discontinuous mode, wherein the current that flows into the parallel combination of $C_2$ and the EDS load capacitance will depend on the input voltage $V_{IN}$, the switching period T, and the duty cycle D of PWM signal 208. The converter currents will be inversely proportional to the inductance values of $L_1$ and $L_2$, as shown in Equations (1) and (2). The phenomenon of generating high voltages by continually charging a capacitive load is desirable for EDS applications, because voltages in the kilovolt range can be produced in this way. The problem remains that with no or very limited energy dissipative component to load 104, the voltage across $C_2$ will rise to an undesirable magnitude unless other measures are taken.

Figure 4:
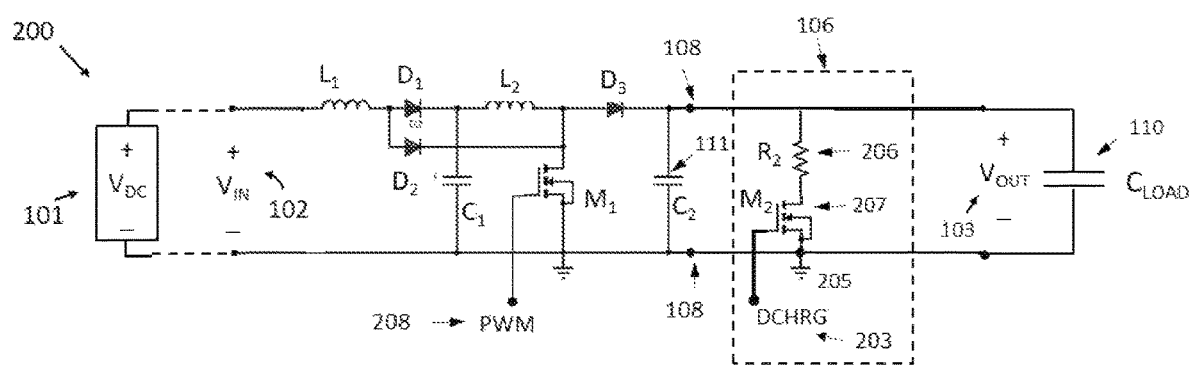
FIG. 4 shows one implementation of the disclosed invention using a cascaded-boost converter.

The circuit of FIG. 4 shows one embodiment of the DC/AC converter 106 connected across terminals 108.

Resistor 206, labeled $R_2$, is connected in series with $M_2$ transistor 207 which operates as a switch. The series combination of $R_2$ and $M_2$ is connected across terminals 108. In the embodiment of FIG. 4, $M_2$ is a MOSFET, and the load is capacitor 110 ($C_{LOAD}$). A periodic signal 203 (DCHRG), which generally has a much lower frequency than PWM signal 208 driving $M_1$, is connected to the control terminal of $M_2$, which is the gate of MOSFET 207 in the embodiment of FIG. 4. While FIG. 4 shows the source of MOSFET 207 connected to ground 205, and resistor 206 connected to the positive (+) $V_{OUT}$ terminal, an arrangement wherein the positions are reversed, with the drain of MOSFET 207 connected to the (+) $V_{OUT}$ terminal and the resistor 206 connected to ground 205, is also within the scope of the invention. Likewise, FIG. 4 shows $M_1$ and $M_2$ as n-channel MOSFETs, but appropriately connected p-channel MOSFETs or BJT devices could also be used.

When periodic signal DCHRG is high in FIG. 4, transistor $M_2$ turns on (becomes conducting), effectively connecting $R_2$ in parallel with $C_{LOAD}$. This connection discharges any voltage across $C_{LOAD}$ with a time constant on the order of $R_2(C_2+C_{LOAD})$, where $C_2$ is capacitor 111. (It is known in the art the net capacitance of two capacitors connected in parallel is equal to their sum). When DCHRG is low, $M_2$ turns off, effectively disconnecting $R_2$ from the circuit. During this time interval, the capacitor $C_2$ inside CBC 200 and $C_{LOAD}$ will be charged together by the circuitry of the CBC.

Figure 5A:
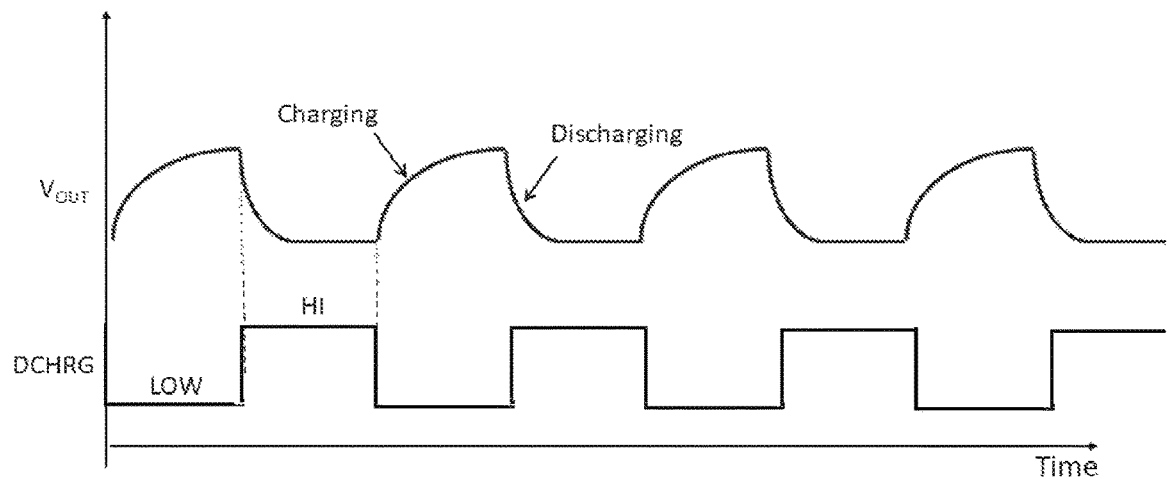
FIGS. 5A and 5B show waveforms relevant to the circuit of FIG. 4.
Figure 5B:
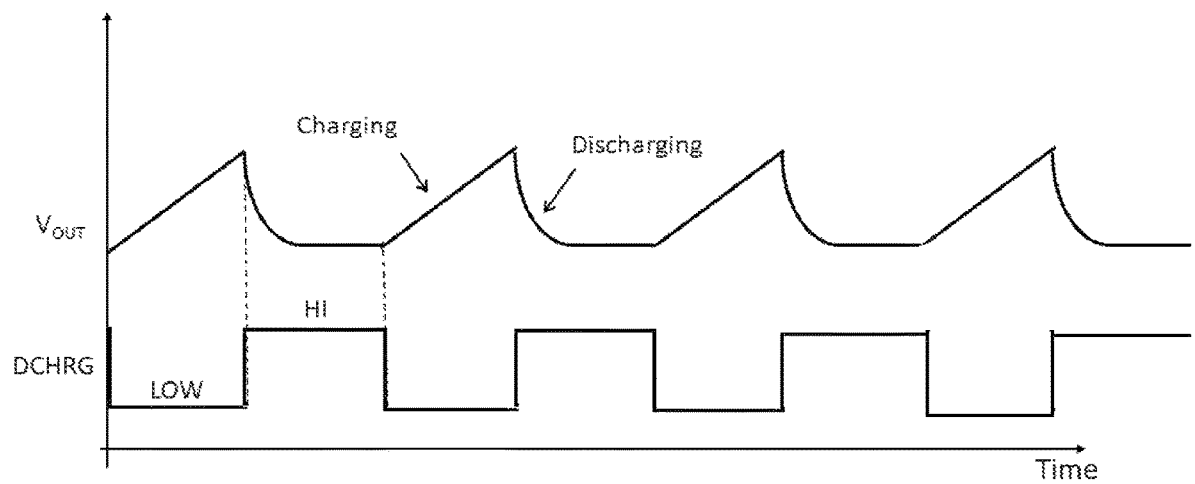

FIG. 5A generally shows the relationship over time between DCHRG and $V_{OUT}$ for the case were the voltage charging $C_{LOAD}$ has an output resistance. In some cases, the output of CBC 200 can be modeled as a current source of value $I_0$. In such cases, $C_2$ in parallel with $C_{LOAD}$ will be charged linearly with slope $dv/dt=I_0(C_2+|C_{LOAD})$ during the off phase of $M_2$. The resulting output voltage for this latter case is shown in FIG. 5B.

An important metric in the design of a CBC which drives a capacitive load is the time required for the output to rise from zero to some desired output voltage, for example, to 1.3 kV in one embodiment of relevance to the EDS. Because the average current that charges the combined ($C_2+C_{LOAD}$) is proportional to the duty cycle D and PWM period T (see Equation 1), the CBC can be modeled as having an equivalent "resistance" $R_S$ charging ($C_2+C_{LOAD}$) as follows:

$$R_S \propto L\frac{1}{DT} \quad (4)$$

The time constant for charging $C_2$ in the circuit of FIG. 4 can be expressed as:

$$\tau = R_S(C_2 + C_{LOAD}) \propto L\frac{1}{DT}(C_2 + C_{LOAD}) \quad (5)$$

The values T=0.167 ms (f=6 kHz) and D=0.6 comprise exemplary parameters suitable for use in an EDS system, but other values are possible within the scope of the invention. These parameters can provide a good balance between the charging rate when DCHRG is low, and the power consumption that occurs when transistor $M_1$ switches between its on and off states. These values are also favorable for reducing the effects of second-order parameters in the circuit, such as the internal series resistances of inductors $L_1$ and $L_2$, forward voltage drops of diodes $D_1$, $D_2$, and $D_3$, and capacitor dissipation effects. Of note is the fact that the CBC will operate in the discontinuous conduction mode when the load current is too small to maintain continuous-mode operation. This phenomenon is consistent with traditional analysis outlined, for example, in *Fundamentals of Power Electronics* by Erickson and Maksimovic (Springer 2020).

Figure 6:
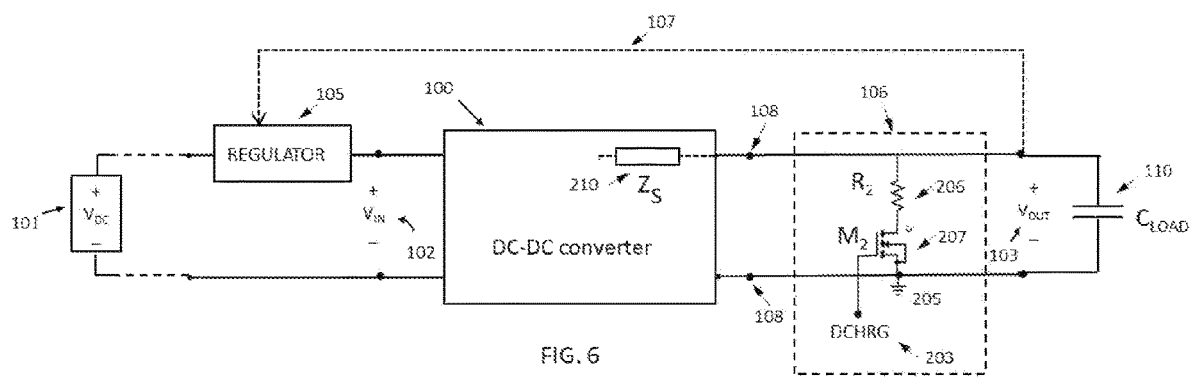
FIG. 6 is a representation of one aspect of the disclosed invention wherein the power-supply module has a series output impedance.

FIG. 6 shows the above version of the DC/AC converter 106 connected to a more general version of DC-to-DC converter 100. Internal impedance 210 represents the series impedance $Z_S$ seen looking into the output terminals of DC-to-DC converter 100. In general, the magnitude of impedance 210 must be larger than the resistance of $R_2$, typically (but not limited to) at least ten times larger. To the extent that $Z_S$ can be represented by a resistance $R_S$, a metric for the charging of $C_{LOAD}$ in FIG. 6 will be the charging time-constant parameter $R_S(C_{LOAD}+C_2)$.

Figure 7:
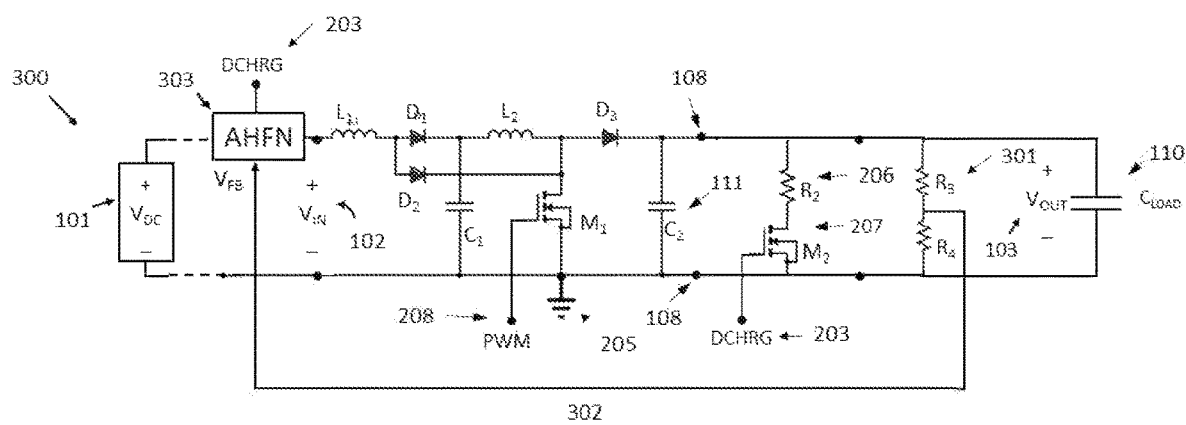
FIG. 7 shows a version of the circuit incorporating an analog hysteretic feedback circuit.

Referring now to FIG. 7, an analog-hysteretic, two-position feedback network 303 (AHFN), functioning as the regulator 105 shown in FIG. 2, is added to circuit 200 of FIG. 4 to produce modified circuit 300. The AHFN 303 regulates the peak output voltage so that it cannot rise above a predetermined level even if discharge signal 203 has not yet turned on transistor $M_2$ to initiate the discharge of $C_2$ and $C_{LOAD}$. Feedback resistors $R_3$ and $R_4$ in FIG. 7 form a voltage divider 301 that produces a reduced version of $V_{OUT}$ by attenuating it to a level consistent with the limits of standard operational amplifiers or similar components, typically no larger than about 20 V. Because $V_{OUT}$ can be in the kilovolt range, this feature is necessary for proper operation of AHFN 303, as explained below. Note that R3 and R4 should be much larger than $R_2$, a factor of at least ten times higher, to avoid $R_3$ and $R_4$ effecting the discharge time of $C_{LOAD}$.

AHFN 303 establishes a connection between the input voltage source 101 and input 102 to the CBC, but only if output voltage 103 has not yet reached a predetermined value during the charging phase of $C_{LOAD}$. Once the predetermined output voltage has been reached, AHFN 303 temporarily disconnects the CBC from input voltage source 101. Reconnection occurs once $C_{LOAD}$ has been discharged by resistor $R_2$ via transistor $M_2$. This discharging occurs during the "on" phase of $M_2$.

Figure 8:
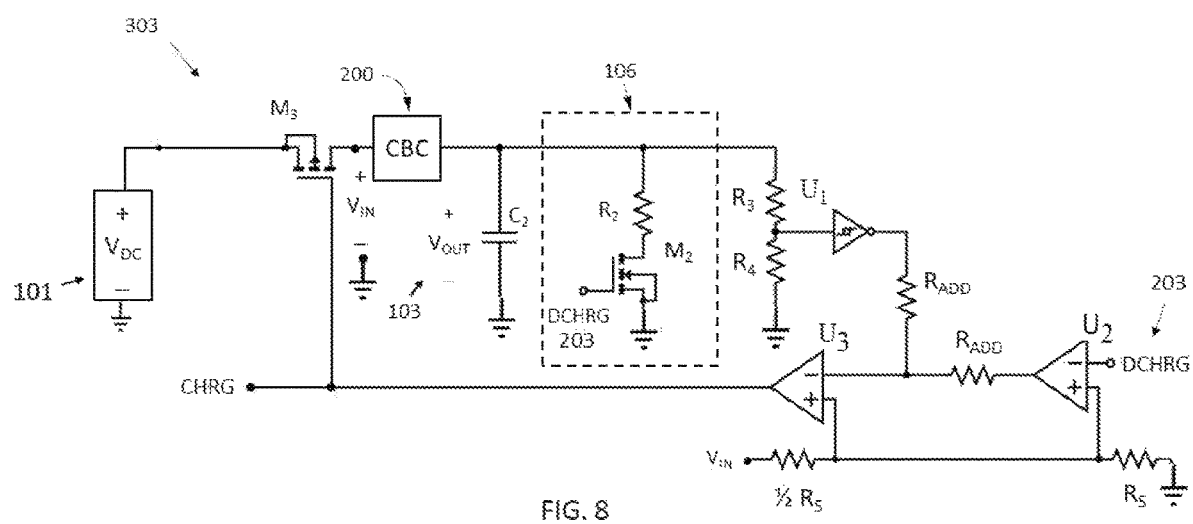
FIG. 8 shows the details of one embodiment of the analog hysteretic feedback circuit of FIG. 7.

Referring now to FIG. 8, details of one embodiment of AHFN 303 are shown. A signal 204 (CHRG) is applied to the gate of p-channel MOSFET $M_3$, and signal 203 (DCHRG) is applied to both $M_2$ and the V_ input of circuit $U_2$. Operation of the circuit over one period of $V_{OUT}$ is described as follows: Charging signal CHRG and discharge signal DCHRG both start in their low ("logic 0") states. The low value of CHRG turns on p-channel MOSFET $M_3$, thereby connecting input voltage $V_{DC}$ (101) to cascaded-boost converter 200. Resistor $R_2$ is also disconnected from the circuit via MOSFET $M_2$, because DCHRG is also low, thereby placing $M_2$ in its off state. In one embodiment, the DCRHG signal may comprise a 5-Hz, 50-percent duty cycle waveform that proceeds regardless of the output of the feedback network comprising $R_3$ and $R_4$. In one embodiment, $U_1$ is a Schmitt trigger whose output goes to its high ("logic 1") when the feedback voltage between $R_3$ and $R_4$ rises to 10 V; $U_1$ goes low again when the feedback voltage falls to 4 V. These values comprise the hysteresis voltages of Schmitt trigger $U_1$ in the disclosed embodiment. Other values of these transition voltages can be used without departing from the intent of the invention.

For the purposes of this disclosure, a "Schmitt trigger" is a comparator circuit with hysteresis implemented by applying positive feedback to the non-inverting input of a comparator or differential amplifier. According to embodiments, a Schmitt trigger may be an active circuit which converts an analog input signal to a digital output signal. The Schmitt trigger may be a configured to include an output that retains its value until the input changes sufficiently to trigger a change. In a non-inverting configuration, when the input is higher than a chosen threshold, the output is high. According to embodiments, and further, configurations thereof, when the input is below a different (lower) chosen threshold the output is low, and when the input is between the two levels the output retains its value. This dual threshold action is called hysteresis and implies that the Schmitt trigger may possess a memory and can act as a bistable multivibrator (latch or flip-flop), in embodiments.

Figure 9:
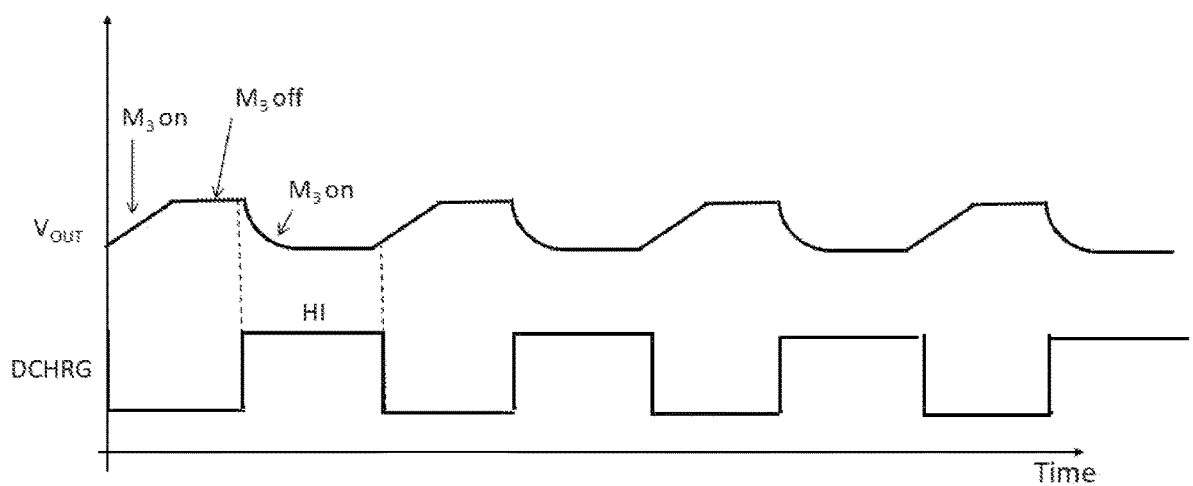
FIG. 9 illustrates exemplary waveforms for the circuit of FIG. 7.
Figure 10:
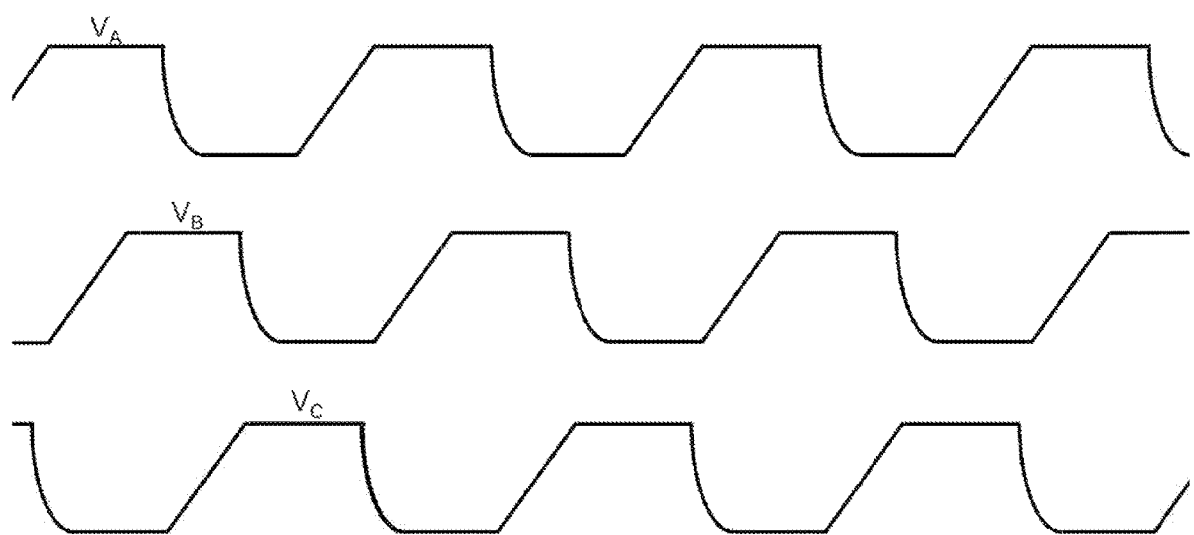
FIG. 10 shows exemplary waveforms for a three-phase version of the disclosed power supply.

In embodiments, when the input to Schmitt trigger $U_1$ is 12 V, the output of $U_1$ is forced to its high output state (e.g., "logic 1"), causing three events occur: (1) The DCHRG signal is inverted by comparator $U_2$; (2) the summation circuit formed by two same-valued resistors $R_{ADD}$, with their midpoint connected to the (−) input of operational amplifier $U_3$, then creates a voltage of 6 V at the V_ inverting input of $U_3$; and (3) the output of $U_3$ switches to its high voltage output state, thus turning off p-channel MOSFET $M_3$ connected between CBC 200 and DC source 101. For the purposes of this disclosure, "comparator" is a device that compares two or more voltages or currents, and outputs a signal indicating which is larger. A comparator may include one or more specialized high-gain differential amplifiers. The output of $U_3$ is held high until DCHRG goes high, at which point $M_2$ turns on and discharges $C_2$ and any $C_{LOAD}$ connected in parallel with $C_2$. Here again, $C_{LOAD}$ may represent an EDS capacitance. During this time interval, $M_2$ will still be off, because the voltage at the noninverting input of $U_3$ will still be large enough to force the output of $U_3$ to its high voltage. Only when DCHRG again goes low does $M_3$ turn back on. This operation ensures that the CBC will only charge $C_2$ and $C_{LOAD}$ until the desired peak output voltage is reached. The resulting output 103 will thus take the form of a 50% duty cycle output, even though the CBC has only operated for a fraction of the portion of the cycle over which the output $V_{OUT}$ is high. FIG. 9 shows a typical output waveform derived from the circuit of FIG. 4 with the AHFN of FIG. 8 connected as in FIG. 7. The output waveform may correspond to the interdigitated electrodes disposed on or in the EDS. The electrodes may be configured to produce one or more traveling electrostatic fields, those in turn exerts a coulomb and other forces on deposited particles, thereby transporting the particles to one or more edges of the EDS. The traveling electrostatic field functions to clear the EDS of debris and increasing the effectiveness of the EDS, according to embodiments of the present subject matter. In solar applications, this clearing of particles substantially restores the power output of the collector, in embodiments wherein the EDS is a photovoltaic panel. The electrostatic field may charge the dust particles and remove the dust particles (or move to an acceptable degree and area) without the need for physical contact. In embodiments the process of removing dust from an EDS (i.e., soiling) may be controlled manually or automatedly by one or more computers, processors, systems, or combination thereof.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. An AC power supply for connection to at least one electrode of an electrodynamic screen, the power supply comprising:
   a DC-to-DC converter electrically coupled to a source of DC voltage, the DC-to-DC converter further comprising an output of the DC-to-DC converter;
   a DC-to-AC converter electrically coupled to the output of the DC-to-DC converter, the DC-to-AC converter comprising a two-terminal passive element electrically coupled in series with a first transistor, the first transistor comprising a control terminal, wherein the control terminal of the first transistor is electrically coupled to a periodic voltage signal configured to switch the first transistor into an on state and an off state;
   an AC output, the AC output comprising an AC voltage configured to change periodically;
   a regulator circuit configured to sample the AC output voltage of the power supply, the regulator circuit further configured to detect when the AC output voltage reaches a predetermined voltage, and wherein;
   the regulator circuit is configured to electrically couple the power supply to the source of DC voltage when the output voltage is less than the predetermined voltage.

2. The power supply of claim 1, wherein the periodic voltage signal is configured to control the on/off state of the at least a transistor causes the AC output to transition periodically, at a predetermined frequency, between zero and a positive or negative voltage of a magnitude larger than zero.

3. The power supply of claim 2, wherein the periodic voltage signal comprises a frequency, the frequency configured to vary.

4. The power supply of claim 2, wherein the second transistor is a p-channel MOSFET.

5. The power supply of claim 1, wherein the regulator circuit comprises a second transistor configured to connect and disconnect the power supply to the source of DC voltage.

6. The power supply of claim 1, wherein the DC-to-DC converter is a cascaded-boost converter.

7. The power supply of claim 6, wherein the cascaded-boost converter operates in a discontinuous mode.

8. The power supply of claim 1, wherein the output voltage is applied to at least one electrode of an electrodynamic screen, the electrode comprising a capacitance electrically coupled in parallel with the AC output of the power supply.

9. The power supply of claim 1, wherein the periodic voltage signal configured to control the on/off state of the first transistor causes the AC output of the power supply to transition periodically between a positive voltage and a negative voltage.

10. The power supply of claim 9, wherein the periodic voltage signal comprises a frequency, the frequency configured to change over time.

11. The power supply of claim 1, wherein the periodic voltage is produced by an astable multivibrator.

12. The power supply of claim 1, wherein the AC output comprises a plurality of distinct AC outputs.

13. The power supply of claim 12, wherein the plurality of distinct AC outputs apply poly-phased voltages to a plurality of electrodes of an electrodynamic screen.

14. The power-supply circuits of claim 13, wherein the number of poly-phased voltages is between two and five.

15. The power supply of claim 1, wherein the AC output voltage of the power supply is configured to transition periodically between a voltage near zero and a voltage, wherein the voltage comprises a magnitude no larger than one kilovolt.

16. The power supply of claim 15, wherein the magnitude of the AC output voltage of the power supply is configured to increase in magnitude to a predetermined value that is larger than one kilovolt.

* * * * *